June 26, 1956 W. G. HALL 2,752,510

MAGNETIC CIRCUITS

Filed May 24, 1955

WITNESSES

INVENTOR

William G. Hall

BY

ATTORNEY

United States Patent Office 2,752,510

Patented June 26, 1956

2,752,510

MAGNETIC CIRCUITS

William G. Hall, Wilkinsburg, Pa., assignor to Westinghouse Electric Corporation, East Pittsburgh, Pa., a corporation of Pennsylvania Application May 24, 1955, Serial No. 510,670

7 Claims. (Cl. 307—88)

This invention relates to logic circuits and more particularly to "not" circuits of the magnetic type.

A "not" circuit is defined herein as a circuit which has substantially no output voltage or current when an input control signal of predetermined magnitude is applied thereto, and an output voltage or current of predetermined magnitude when no input control signal is applied thereto.

An object of this invention is to provide a new and improved magnetic type "not" circuit.

A more specific object of this invention is to provide in a "not" circuit means for driving a magnetic core member to negative saturation in response to an input control signal so that when a supply voltage of predetermined magnitude effects a driving of the magnetic core member to positive saturation substantially all of the supply voltage is absorbed in effecting such a driving to positive saturation and the output voltage of the "not" circuit is of substantially zero magnitude.

Another specific object of this invention is to so interconnect a non-linear device in the reset circuit of the "not" circuit that when the control signal applied to the reset circuit is effecting a driving of the associated magnetic core member to negative saturation, the non-linear device acts as a low valued impedance and once the magnetic core member is driven to negative saturation the non-linear device acts as a relatively high valued impedance, to thereby enable the control signal to effect a driving of the magnetic core member to negative saturation and prevent an excessive flow of current in the reset circuit which in turn would place a drain on the source of the control signal and which might damage the components of the reset circuit.

A further specific object of this invention is to provide for so interconnecting a non-linear device in the gating circuit of a magnetic type "not" circuit that either substantially zero output voltage or substantially full output voltage is obtained from the "not" circuit depending upon whether a control signal is or is not applied to its input.

Still another object of this invention is to provide a magnetic type "not" circuit having a relatively high power efficiency.

Other objects of this invention will become apparent from the following description when taken in conjunction with the accompanying drawing, in which.

Figure 1:
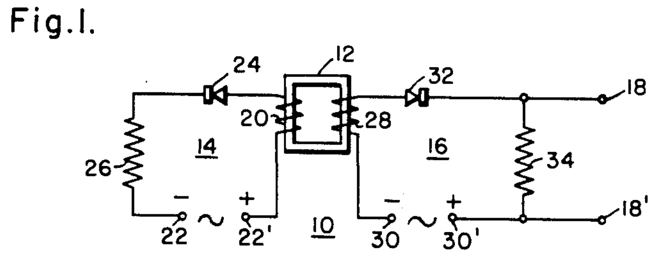
Figure 1 is a schematic diagram of apparatus and circuits illustrating an embodiment of this invention.

Referring to Fig. 1, there is shown a "not" circuit 10 which illustrates one embodiment of the teachings of this invention. In general, the "not" circuit 10 comprises a magnetic core member 12, constructed of rectangular looped core material, a reset circuit 14 for driving the magnetic core member 12 to negative saturation when a control signal is applied thereto and a gating circuit 16 for driving the magnetic core member 12 from negative to positive saturation when a control signal has been applied to the reset circuit 14 during the previous half-cycle of operation and for producing an output voltage across the output terminals 18 and 18' when no control signal has been applied to the reset circuit 14 during the previous half-cycle of operation.

The reset circuit 14 comprises a reset winding 20 disposed in inductive relationship with the magnetic core member 12, terminals 22 and 22' to which is intermittently applied an alternating-current control voltage or signal, a blocking rectifier 24 for preventing the flow of current through the reset winding 20 when the polarity of the voltage across the terminals 22 and 22' is opposite from that shown in Fig. 1, and a current-limiting impedance member, specifically a linear resistor 26, for limiting the flow of current through the reset winding 20 when the polarity of the voltage across the terminals 22 and 22' is as shown in Fig. 1. As illustrated, the reset winding 20, the blocking rectifier 24, the current-limiting resistor 26, and the terminals 22 and 22' are all connected in series circuit relationship with one another. In practice, the various components of the gating circuit 14 are so constructed and the magnitude of the alternating-current control voltage applied to the terminals 22 and 22' is such as to always effect a driving of the magnetic core member 12 from positive to negative saturation.

The "not" circuit 10 may be incorporated into various types of control circuits. In one type of control circuit the control voltage applied to the terminals 22 and 22' may be of one magnitude while if the "not" circuit 10 is incorporated in another type of control circuit the magnitude of the control voltage applied to the terminals 22 and 22' may be of lesser or greater magnitude. Further, in operation within a given control circuit the control voltage applied to the terminals 22 and 22' may vary in magnitude. If the magnitude of the control voltage applied to the terminals 22 and 22' is small, then the impedance value of the current-limiting impedance member 26 should likewise be small. The reason for this is that with a small magnitude of control voltage applied to the terminals 22 and 22' and with a high impedance value for the current-limiting impedance member 26 too great a portion of the voltage would be absorbed across the current-limiting impedance member 26 and there would not be sufficient voltage across the reset winding 20 to effect a driving of the magnetic core member 12 to negative saturation. However, the impedance value of the current-limiting impedance member 26 has to be sufficiently large to limit the flow of current through the reset circuit 14 once the magnetic core member 12 has been driven to negative saturation.

On the other hand, when a control voltage of relatively large magnitude is applied to the terminals 22 and 22' the impedance value for the current-limiting impedance member 26 should be relatively high so as to properly limit the magnitude of the current flow through the reset circuit 14 once the magnetic core member 12 has been driven to negative saturation. However, the impedance value of the current-limiting impedance member 26, when a relatively large magnitude of voltage is applied to the terminals 22 and 22', cannot be too high since sufficient voltage would not appear in operation across the reset winding 20 to effect a driving of the magnetic core member 12 to negative saturation. Thus, the ideal condition is where substantially all of the control voltage applied to the terminals 22 and 22' appears across the reset winding 20 when driving the magnetic core member 12 to negative saturation and then once negative saturation is reached having a relatively high impedance in the reset circuit 14 to limit the flow of current therein. The means for obtaining such an action will be described hereinafter with reference to the apparatus shown in Figs. 2 and 3.

In this instance, the gating circuit 16 comprises a load winding 28 disposed in inductive relationship with the magnetic core member 12 and so disposed thereon that when current flows therethrough the magnetic core member 12 is driven to positive saturation; terminals 30 and 30' to which is applied an alternating-current supply voltage of the same frequency as the alternating-current control voltage applied to the terminals 22 and 22'; a blocking rectifier 32 for blocking the flow of current through the load winding 28 when the polarity of the supply voltage applied to the terminals 30 and 30' is as shown in Fig. 1; and a current-carrying impedance member, specifically a resistor 34. As illustrated, the load winding 28, the blocking rectifier 32, the current-carrying impedance member 34 and the terminals 30 and 30' are connected in series circuit relationship with one another.

In practice, the various components of the gating circuit 16 and the magnitude of the supply voltage applied to the terminals 30 and 30' is such as to be capable of driving the magnetic core member 12 from negative to positive saturation with substantially all of the voltage appearing across the terminals 30 and 30' being absorbed in effecting the drive to positive saturation. Also in practice, the current-carrying impedance member 34 is so chosen as to have a sufficiently high impedance value as to insure that a relatively large amount of current flows to the load (not shown) connected to the output terminals 18 and 18' when no control voltage has been applied to the terminals 22 and 22' during the previous half-cycle of operation. However, the impedance value of the current-carrying impedance member 34 should not be so high that the supply voltage, applied to the terminals 30 and 30', is unable to effect a driving of the magnetic core member 12 from negative to positive saturation when on the previous half-cycle of operation, the magnetic core member 12 has been driven to negative saturation by the effect of the control voltage applied to the terminals 22 and 22'.

The operation of the apparatus shown in Fig. 1 will now be described. Assuming the polarity of the supply voltage applied to the terminals 30 and 30' is opposite from that shown in Fig. 1, then current flows from the terminal 30 through the load winding 28, the blocking rectifier 32 in the forward direction and the current-carrying impedance member 34, to the terminal 30'. Such an action effects a driving of the magnetic core member 12 to positive saturation and substantially all of the voltage is absorbed across the load winding 28 in driving the magnetic core member 12 to positive saturation and except for the magnetizing current flowing through the current-carrying impedance member 34, the voltage across the output terminals 18 and 18' is of substantially zero magnitude. Then, on the next half-cycle of the alternating-current supply voltage applied to the terminals 30 and 30', which the terminal 30' positive with respect to the terminal 30, if no control voltage is applied to the terminals 22 and 22', the magnetic core member 12 remains in positive saturation. During this latter half-cycle of operation the blocking rectifier 32 prevents the flow of current through the gating circuit 16.

However, during the next half-cycle of the supply voltage applied to the terminals 30 and 30', with the terminal 30 positive with respect to the terminal 30', current flows through the gating circuit 16 as hereinbefore described, however, substantially no voltage drop appears across the load winding 28 and an output voltage appears across the output terminals 18 and 18'.

Assuming a control voltage is applied to the terminals 22 and 22', then when this voltage is of a polarity as shown in the drawing, current flows from the terminal 22' through the reset winding 20, the blocking rectifier 24 and the current-limiting impedance member 26, to the terminal 22. Such an action effects a driving of the magnetic core member 12 to negative saturation. Then, during the next half-cycle of the alternating-current supply voltage applied to the terminals 30 and 30', with the terminal 30 positive with respect to the terminal 30', current flows from the terminal 30 through the load winding 28, the blocking rectifier 32 in the forward direction and the current-carrying impedance member 34, to the terminal 30'. Such a current flow effects a driving of the magnetic core member 12 to positive saturation and as hereinbefore mentioned, substantially all the voltage is absorbed across the load winding 28 in driving the magnetic core member 12 to positive saturation and substantially no voltage appears across the output terminals 18 and 18'. During the same half-cycle of operation when the magnetic core member 12 is being driven to positive saturation by the action of the current flow through the load winding 28, the blocking rectifier 24 in the reset circuit 14 prevents the flow of current through the reset winding 20.

During the next half-cycle of operation, assuming the alternating-current control voltage is still being applied to the terminals 22 and 22', then the current flow through the reset winding 20 again drives the magnetic core member 12 to negative saturation. During this same half-cycle of operation, the blocking rectifier 32 in the gating circuit 16 prevents the flow of current through the load winding 28. Thus, as can be realized from the above discussion, when a control voltage is applied to the terminals 22 and 22', substantially no voltage appears across the output terminals 18 and 18'. On the other hand, when no control voltage is applied to the terminals 22 and 22', a voltage of predetermined magnitude does appear across the output terminals 18 and 18'.

Figure 2:
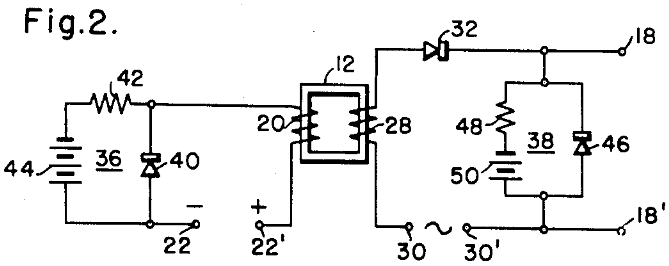
Fig. 2 is a schematic diagram of apparatus and circuits illustrating another embodiment of this invention in which a direct-current control signal is applied to the reset circuit of the "not" circuit, and in which both the gating and reset circuits are provided with a non-linear device.

Referring to Fig. 2, there is illustrated another embodiment of the teachings of this invention in which like components of Figs. 1 and 2 have been given the same reference characters. The main distinction between the apparatus shown in Figs. 1 and 2 is that in the apparatus of Fig. 2 a direct-current control voltage is applied to the terminals 22 and 22' and a non-linear device 36 has been substituted for the current-limiting impedance member 26 shown in Fig. 1, and a non-linear device 38 has been substituted for the current-carrying impedance member 34 shown in Fig. 1.

The function of the non-linear device 36 is to enable substantially all of the direct-current control voltage appearing across the terminals 22 and 22' of Fig. 2 to appear across the reset winding 20 when the magnetic core member 12 is being driven to negative saturation by the action of the current flow through the reset winding 20. Further, the non-linear device 36 functions to present a relatively high impedance to the flow of current through the reset winding 20 once the magnetic core member 12 has been driven to negative saturation.

Figure 4:
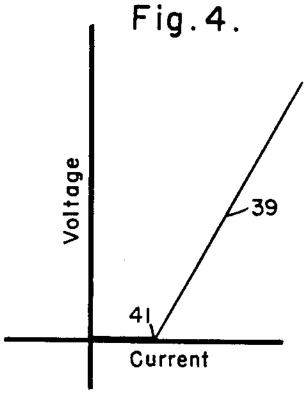
Fig. 4 is a graph illustrating the voltage-current characteristic of the non-linear devices shown in Figs. 2 and 3.

Referring to Fig. 4, the voltage-current characteristic of the non-linear device 36 is shown by a curve 39. As can be seen from the curve 39, the voltage across the non-linear device 36 is of substantially zero magnitude until the current input thereto reaches a point 41. Thus, if the demagnetizing current flow through the reset winding 20 of Fig. 2 is of smaller magnitude than the value at point 41, substantially no voltage appears across the non-linear device 36, and therefore, substantially all of the direct-current control voltage applied to the terminals 22 and 22′ is available for effecting a driving of the magnetic core member 12 to negative saturation. However, as is illustrated by the curve 39, once the magnitude of the current flow to the non-linear device 36 increases to a value above the point 41, then the voltage across the non-linear device 36 increases. When the magnetic core member 12 has been driven to negative saturation, the current flow to the non-linear device 36 increases beyond the point 41 and therefore the non-linear device 36 offers a relatively high impedance to the flow of current through the reset winding 20 once the magnetic core member 12 has been driven to negative saturation. This prevents too high a current from being drained from the source (not shown) supplying the direct-current control voltage applied to the terminals 22 and 22′, and it also prevents too high a current flow through the blocking rectifier 24 and the reset winding 20 which may be large enough to cause damage to these two components.

In this instance, the non-linear device 36 comprises a series circuit including a rectifier 40 and an impedance member 42 having a relatively high impedance value, and a direct-current source, specifically a battery 44, connected across the series circuit, including the impedance member 42 and the rectifier 40, so as to apply a forward bias to the rectifier 40. In practice, the slope of the curve 39, shown in Fig. 4, is determined by the impedance value of the impedance member 42. It is to be understood that any other suitable non-linear device (not shown) that has a voltage-current characteristic curve similar to that shown in Fig. 4 could be substituted for the non-linear device 36.

The non-linear device 38 is similar to the non-linear device 36 and comprises a series circuit including a rectifier 46 and an impedance member 48 having a relatively high impedance value and a direct-current source, specifically a battery 50, which is connected across the series circuit, including the impedance member 48 and the rectifier 46, so as to apply a forward bias to the rectifier 46. The voltage-current characteristic of the non-linear device 38 is also represented by the curve 39 shown in Fig. 4. When magnetizing current is flowing through the load winding 28 to effect a driving of the magnetic core member 12 to positive saturation, the magnitude of this magnetizing current is less than the value shown at point 41, in Fig. 4. Therefore, substantially no voltage appear across the non-linear device 38 and thus when the magnetic core member 12 is being driven to positive saturation, no voltage appears across the output terminals 18 and 18′. However, assuming no direct-current control voltage is applied to the terminals 22 and 22′ of Fig. 2, and the magnetic core member 12 is at positive saturation when the terminal 30 becomes positive with respect to the terminal 30′, then the non-linear device 38 offers a high impedance to the flow of current in the gating circuit and substantially all of the current flowing through the blocking rectifier 32 in the forward direction is available for the load (not shown) connected to the output terminals 18 and 18′. This means that the power efficiency of the "not" circuit shown in Fig. 2 is high, and thus full output can be obtained therefrom.

Figure 5:
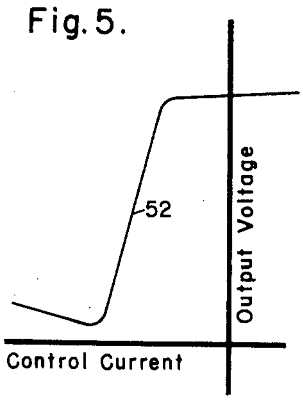
Fig. 5 is a graph illustrating the transfer curve for the "not" circuit shown in Fig. 1.
Figure 6:
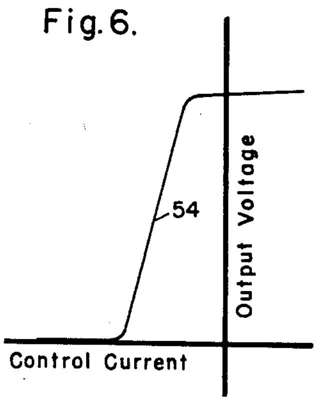
Fig. 6 is a graph illustrating the transfer curve for the "not" circuits shown in Figs. 2 and 3.

A comparison between the transfer curves for the "not" circuits shown in Figs. 1 and 2 is shown in Figs. 5 and 6. For instance, a curve 52 represents the transfer curve for the "not" circuit 10 shown in Fig. 1. As can be seen from the curve 52, the output voltage of the "not" circuit 10 can never be reduced to zero magnitude. As hereinbefore mentioned, the reason for this is that magnetizing current flowing through the current-carrying impedance member 34 develops a voltage thereacross which appears across the output terminals 18 and 18′. Further, owing to the normally lower impedance presented by the current-carrying impedance member 34 as compared to the impedance offered by the non-linear device 38, the "not" circuit 10 shown in Fig. 1 cannot develop full output.

A curve 54 represents the transfer curve for the "not" circuit shown in Fig. 2. As can be seen from the curve 54, the "not" circuit of Fig. 2 can produce zero output voltage across the terminals 18 and 18′ since as hereinbefore explained, the voltage across the non-linear device 38 for small magnitudes of input current thereto is of substantially zero magnitude.

When applying a "not" circuit to a specific control circuit (not shown), the accuracy of the control circuit (not shown) is determined by whether the "not" circuit is capable of producing zero output voltage when a control voltage is applied to its reset circuit and is also capable of producing full output when no control voltage is applied thereto. In other words, the "not" circuit shown in Fig. 2, when applied in a specific control circuit (not shown), would produce a more accurate control circuit (not shown) than would the "not" circuit 10 shown in Fig. 1 if it were incorporated in the specific control circuit (not shown).

In practice, the reset winding 20 and the nonlinear device 36 are such and the magnitude of the direct-current control voltage applied to the terminals 22 and 22′ shown in Fig. 2 is such as to always effect a driving of the magnetic core member 12 to negative saturation. On the other hand, the load winding 28, the blocking rectifier 32 and the non-linear device 38 shown in Fig. 2 are such and the supply voltage applied to the terminals 30 and 30′ is such that substantially all of the voltage appearing across the terminals 30 and 30′ is absorbed across the load winding 28 in driving the magnetic core member 12 from negative to positive saturation.

The operation of the "not" circuit shown in Fig. 2 is similar to the operation of the "not" circuit 10 shown in Fig. 1, except that the polarity of the voltage across the terminals 22 and 22′ shown in Fig. 2 remains unchanged and is as shown in Fig. 2. Such being the case, there is no need for a blocking rectifier such as the blocking rectifier 24 shown in Fig. 1.

When the terminal 30 of Fig. 2 is at a positive polarity with respect to its associated terminal 30′, magnetizing current flows through the load winding 28, the blocking rectifier 32 in the forward direction and the non-linear device 38 to the terminal 30′, to thereby drive the magnetic core member 12 to positive saturation. Assuming no direct-current control voltage is applied to the terminals 22 and 22′ of Fig. 2, then the magnetic core member 12 remains in positive saturation during the next half-cycle of operation and the blocking rectifier 32 prevents the flow of current through the load winding 28. Then, the next time the terminal 30 becomes positive with respect to the terminal 30′, current freely flows through the load winding 28 and a predetermined output voltage appears across the output terminals 18 and 18′. However, if a direct-current control voltage is applied to the terminals 22 and 22′, with the terminal 30′ at a positive polarity with respect to the terminal 30 of Fig. 2, then current flows from the terminal 22′ through the reset winding 20 and the non-linear device 36 to the terminal 22 of Fig. 2 to thus drive the magnetic core member 12 to negative saturation. Then during the next half-cycle of operation current flows from the terminal 30 of Fig. 2 through the load winding 28, the blocking rectifier 32 and the non-linear device 38 to the terminal 30′ to thus drive the magnetic core member 12 to positive saturation. However, no output voltage appears across the terminals 18 and 18′ of Fig. 2 during this latter half-cycle of operation.

Figure 3:
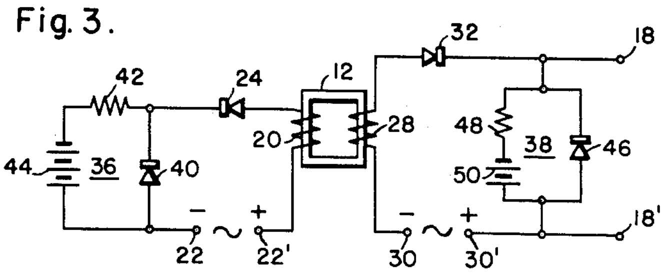
Fig. 3 is a schematic diagram of still another embodiment of this invention in which an alternating-current control signal is applied to the reset circuit of the "not" circuit, and in which both the reset circuit and the gating circuit are provided with a non-linear device.

Referring to Fig. 3, there is illustrated still another embodiment of the teachings of this invention in which like components of Figs. 1, 2 and 3 have been given the same reference characters. The main distinction between the apparatus shown in Figs. 2 and 3 is that in the apparatus of Fig. 3 an alternating-current control voltage is applied to the terminals 22 and 22′, therefore necessitating the need of the blocking rectifier 24 in the reset circuit. Since the operation of the apparatus shown in Fig. 3 is substantially identical to the operation of the apparatus shown in Fig. 2 except for the blocking action of the blocking rectifier 24, which action was described with reference to the apparatus of Fig. 1, a further description of the operation of the apparatus of Fig. 3 is deemed unnecessary.

It is to be understood that other than a sinusoidal shaped alternating-current supply voltage could be applied to the terminals 30 and 30′ of the apparatus shown in Figs. 1 through 3 and still obtain proper operation. In other words, the alternating-current supply voltage could take the form of rectangular shaped pulses. Further, other than a sinusoidal alternating-current control voltage could be applied to the terminals 22 and 22′ shown in the apparatus of Figs. 1 and 3 and still obtain proper operation.

Since numerous changes may be made in the above described apparatus and circuits, and different embodiments of the invention may be made without departing from the spirit and scope thereof, it is intended that all the matter contained in the foregoing description or shown in the accompanying drawing shall be interpreted as illustrative and not in a limiting sense.

I claim as my invention:

1. In a magnetic device, the combination comprising, a magnetic core member, a series connected gating circuit including a load winding disposed in inductive relationship with the magnetic core member, a current-carrying impedance member, a rectifier, and terminals to which is applied an alternating voltage, the series connected gating circuit and the magnitude of the alternating voltage, when applied, being such that on one-half cycle of the alternating voltage substantially all of the voltage would be absorbed in driving the magnetic core member from negative to positive saturation and on the other half-cycle of the alternating voltage the rectifier blocks the flow of current through the load winding, and a series connected reset circuit including a reset winding disposed in inductive relationship with the magnetic core member, a current-limiting impedance member, and terminals to which is intermittently applied a control signal, the series connected reset circuit and the magnitude of the said control signal, when applied, being such as to always effect a driving of the magnetic core member to negative saturation during said other half-cycle of the alternating voltage.

2. In a magnetic device, the combination comprising, a magnetic core member, a series connected gating circuit including a load winding disposed in inductive relationship with the magentic core member, a current-carrying impedance member, a rectifier, and terminals to which is applied an alternating voltage, the series connected gating circuit and the magnitude of the alternating voltage, when applied, being such that on one half-cycle of the alternating voltage substantially all of the voltage would be absorbed in driving the magnetic core member from negative to positive saturation and on the other half-cycle of the alternating voltage the rectifier blocks the flow of current through the load winding, and a series connected reset circuit consisting only of a reset winding disposed in inductive relationship with the magnetic core member, a non-linear device, and terminals to which is intermittently applied a direct-current control signal, the series connected gating circuit and the magnitude of the direct-current control signal, when applied, being such as to always effect a driving of the magnetic core member to negative saturation during said other half-cycle of the alternating voltage.

3. In a magnetic device, the combination comprising a magnetic core member, a series connected gating circuit including a load winding disposed in inductive relationship with the magnetic core member, a current-carrying impedance member, a rectifier, and terminals to which is applied an alternating voltage, the series connected gating circuit and the magnitude of the alternating voltage, when applied, being such that on one half-cycle of the alternating voltage substantially all of the voltage would be absorbed in driving the magnetic core member from negative to positive saturation and on the other half-cycle of the alternating voltage the rectifier blocks the flow of current through the load winding, and a series connected reset circuit consisting only of a reset winding disposed in inductive relationship with the magnetic core member, a non-linear device, another rectifier, and terminals to which is intermittently applied an alternating control voltage, the series connected reset circuit and the magnitude of the alternating control voltage, when applied, being such as to always effect a driving of the magnetic core member to negative saturation during said other half-cycle of the alternating voltage, and said another rectifier functioning to prevent the flow of current through the reset winding during said one half-cycle of the alternating voltage.

4. In a magnetic device, the combination comprising, a magnetic core member, a series connected gating circuit including a load winding disposed in inductive relationship with the magnetic core member, a current-carrying impedance member, a rectifier, and terminals to which is applied an alternating voltage, the series connected gating circuit and the magnitude of the alternating voltage, when applied, being such that on one half-cycle of the alternating voltage substantially all of the voltage would be absorbed in driving the magnetic core member from negative to positive saturation and on the other half-cycle of the alternating voltage the rectifier blocks the flow of current through the load winding, and a reset circuit consisting only of a reset winding disposed in inductive relationship with the magnetic core member, a series circuit having a rectifier and an impedance member of relatively high impedance value, the latter series circuit being adapted to have a source of direct current connected thereacross so as to apply a forward bias to the rectifier connected in series with the impedance member of relatively high impedance value, a blocking rectifier, terminals to which is intermittently applied an alternating control signal, and circuit means for so connecting the last mentioned terminals, the reset winding, and the blocking rectifier in series circuit relationship with one another and with the rectifier connected in series circuit with the impedance member of relatively high impedance value, that during said other half-cycle of the alternating voltage the alternating control signal, when applied, always effects a driving of the magnetic core member to negative saturation and during said one half-cycle of the alternating voltage the blocking rectifier prevents the flow of current through the reset winding.

5. In a magnetic device, the combination comprising, a magnetic core member, a series connected gating circuit including a load winding disposed in inductive relationship with the magnetic core member, a current-carrying impedance member, a rectifier, and terminals to which is applied an alternating voltage, the series connected gating circuit and the magnitude of the alternating voltage, when applied, being such that on one half-cycle of the alternating voltage substantially all of the voltage would be absorbed in driving the magnetic core member from negative to positive saturation and on the other half-cycle of the alternating voltage the rectifier blocks the flow of current through the load winding, a reset circuit consisting only of a reset winding disposed in inductive relationship with the magnetic core member, a series circuit having a rectifier and an impedance member of relatively high impedance value, the latter series circuit being adapted to have a source of direct current connected thereacross so as to apply a forward bias to the rectifier connected in series with the impedance member of relatively high impedance value, terminals to which is intermittently applied a direct-current control signal, and circuit means for so connecting the last mentioned terminals and the reset winding in series circuit relationship with one another and with the rectifier connected in series with the impedance member of relatively high impedance value that during said other half-cycle of the alternating voltage the direct-current control signal, when applied, always effects a driving of the magnetic core member to negative saturation.

6. In a magnetic device, the combination comprising, a magnetic core member, a series connected gating circuit including a load winding disposed in inductive relationship with the magnetic core member, a non-linear device, a rectifier, and terminals to which is applied an alternating voltage, the series connected gating circuit and the magnitude of the alternating voltage, when applied, being such that on one half-cycle of the alternating voltage substantially all of the voltage would be absorbed in driving the magnetic core member from negative to positive saturation and on the other half-cycle of the alternating voltage the rectifier blocks the flow of current through the loading winding, and a series connected reset circuit including a reset winding disposed in inductive relationship with the magnetic core member, a current-limiting impedance member, and terminals to which is intermittently applied a control signal, the series connected reset circuit and the magnitude of the said control signal, when applied, being such as to always effect a driving of the magnetic core member to negative saturation during said other half-cycle of the alternating voltage.

7. In a magnetic device, the combination comprising, a magnetic core member, a gating circuit including a load winding disposed in inductive relationship with the magnetic core member, a series circuit having a rectifier and an impedance member of relatively high impedance value, the series circuit being adapted to have a source of direct current connected thereacross so as to apply a forward bias to the rectifier, a blocking rectifier, terminals to which is applied an alternating voltage, and circuit means for so connecting the terminals, the load winding, and the blocking rectifier in series circuit relationship with one another and with the rectifier connected in the series circuit that on one half-cycle of the alternating voltage current flows through the load winding and on the other half-cycle of the alternating voltage the blocking rectifier blocks the flow of current through the load winding, and a reset circuit consisting only of a reset winding disposed in inductive relationship with the magnetic core member, a series circuit having a rectifier and an impedance member of relatively high impedance value, the latter series circuit being adapted to have a source of direct current connected thereacross so as to apply a forward bias to the rectifier of the reset circuit, terminals to which is intermittently applied a direct-current control signal, and other circuit means for so connecting the last mentioned terminals and the reset winding in series circuit relationship with one another and with the rectifier of the reset circuit that during said other half-cycle of the alternating voltage the direct-current control signal, when applied, always effects a driving of the magnetic core member to negative saturation.

No references cited.